United States Patent [19]
Rothwell

[11] 4,082,246
[45] Apr. 4, 1978

[54] BUTTERFLY VALVE THRUPORT SEAL

[75] Inventor: Thomas F. Rothwell, Bradford, Pa.

[73] Assignee: Dresser Industries, Inc., Dallas, Tex.

[21] Appl. No.: 707,156

[22] Filed: Jul. 21, 1976

[51] Int. Cl.$^2$ .......................................... F16K 1/226
[52] U.S. Cl. ................................................. 251/307
[58] Field of Search ................................ 251/306, 307

[56] References Cited

U.S. PATENT DOCUMENTS

| | | | |
|---|---|---|---|
| 1,951,283 | 3/1934 | Kinzie et al. | 251/307 |
| 2,586,927 | 2/1952 | Fantz | 251/306 |
| 2,980,388 | 4/1961 | White | 251/175 |
| 3,471,120 | 10/1969 | Geiselman | 251/306 |
| 3,525,499 | 8/1970 | Geiselman et al. | 251/306 |
| 3,749,359 | 7/1973 | Montesi | 251/306 |

FOREIGN PATENT DOCUMENTS

| | | | |
|---|---|---|---|
| 1,924,563 | 5/1969 | Germany | 251/306 |
| 1,201,300 | 8/1967 | United Kingdom | 251/307 |

*Primary Examiner*—William R. Cline
*Assistant Examiner*—H. Jay Spiegel
*Attorney, Agent, or Firm*—Daniel Rubin

[57] ABSTRACT

A butterfly valve in which a gasket is secured about the vane periphery and in cooperation with an annular body seat effects a seal for closure of the valve passage. Supporting the gasket in a manner to enable controlled enlargement by a locally applied compression force is an annular recess in the vane face inwardly extending from the periphery and a radial clamping ring securing the gasket in the recess. A plurality of screw fasteners extending through the ring and gasket into the vane body operate when tightened to radially enlarge the elastomer for increasing its sealing capability against the seat. Combined surface interference afforded by each of the ring and recess radially constrain the gasket between the ring and vane enabling the energy of compression imposed by screw tightening to remain stored. In this manner the effected enlargement is substantially restricted to within a controlled peripheral portion of the gasket. Because of the imposed constraint, the adjusted seating surface of the gasket is substantially maintained repeatedly during subsequent operating cycles of the valve.

2 Claims, 4 Drawing Figures

U.S. Patent  April 4, 1978  4,082,246
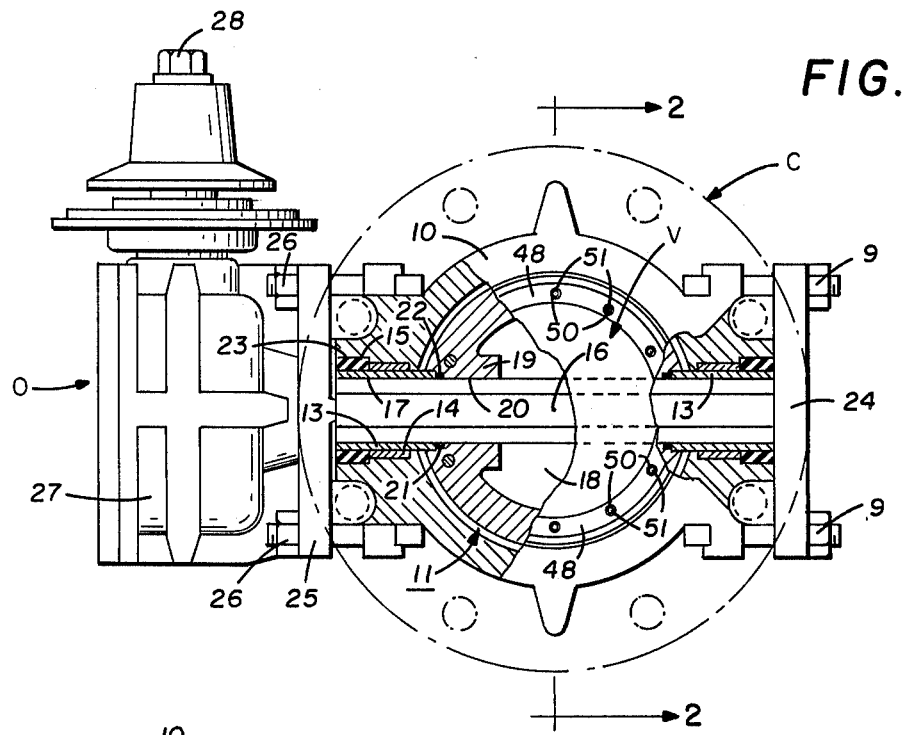
FIG. 1
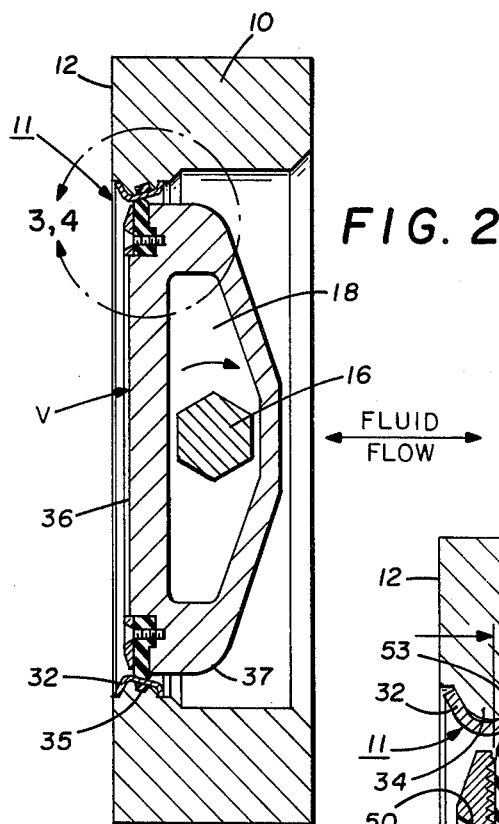
FIG. 2
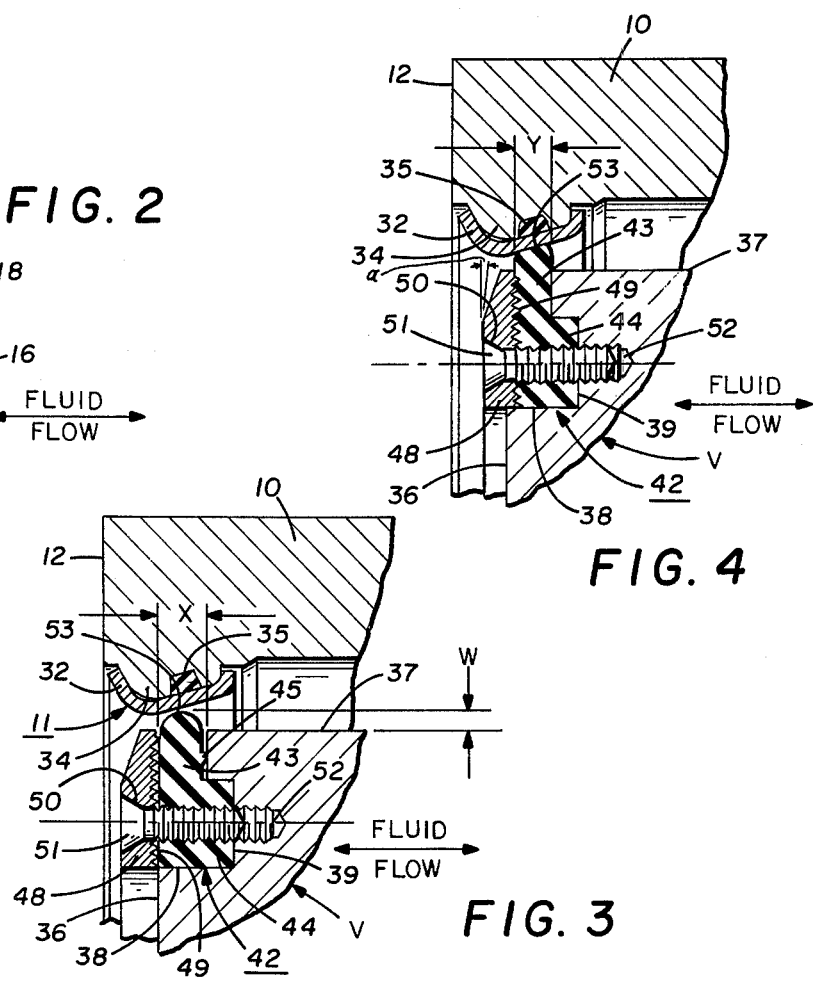
FIG. 4
FIG. 3

BUTTERFLY VALVE THRUPORT SEAL

BACKGROUND OF THE INVENTION

1. The field of art to which the invention pertains includes "Valves and Valve Actuation".

2. The prior art to which the invention is directed includes the art of butterfly valves being of a type in which a usually circular vane or disc is rotatable in a fluid body passage between an open and closed position. When in a closed position, the vane engages a seat with which it cooperates to provide a thruport seal against leakage of the pressurized line contents intended to be contained by the valve. It is desirable, if not essential, in valves of this type that the seal be effective on each occasion of valve closing for the life of the valve to continuously provide positive shutoff with minimum servicing of the components affording the seal.

For such purposes, one or other of the vane or seat is usually of a firm metal construction while the other supports an elastomeric gasket and which together cooperate during valve closure for effecting the desired thruport seal. Exemplifying butterfly valves of this type is the disclosure of U.S. Pat. No. 3,471,120 in which an adjustable vane supports the gasket for engagement against a stainless steel seat. As between the gasket and seat the former is usually the more flexible and relatively softer composition, rendering it highly susceptible to abrading and consequent wear in the course of valve operation. Where local enlargement of the gasket results in a scalloped periphery, the high spots may be excessive to obtain adequate sealing in the low spots causing excessive wear on the former. For obvious reasons such wear over a period of valve use frequently results in the need for maintenance, usually in the form of gasket readjustment or replacement. Either form of maintenance requires access to the valve internals and may even require removal of the valve from the pipeline for that purpose. Despite recognition of the problem, it has not been heretofore known how to retain the desirable flexible characteristics of the gasket while supporting it in a manner whereby the encountered abrading effect can be held to a minimum in order to decrease the high level of maintenance previously associated therewith.

SUMMARY OF THE INVENTION

This invention relates to valves and more particularly to butterfly valves in which an elastomeric gasket is supported on the vane periphery in a manner affording controlled enlargement for enhancing its sealing characteristics while at the same time significantly reducing the in-service wearing abrasion previously associated with such gaskets. This is achieved in accordance herewith by an annular gasket having a more or less L-shaped cross section that is axially clamped in a radially constraining relation between the serrated face of an annular clamping ring and an L-shaped recess in the radial face of the vane. A plurality of uniformly spaced individual screw fasteners extend through the ring and gasket into the vane to secure and adjust the relationship of components.

Individual tightening of the screws enables increased compression to be locally applied against the gasket for obtaining a controlled enlargement at its periphery radially beyond the imposed constraint in presetting a seal interfit with the valve seat. By means of the serrated clamping surface in combination with the L-shaped interfit afforded by the vane recess, the gasket elastomer is radially constrained except where radially beyond the ring at its periphery. In this manner, the energy of compression imposed on the elastomer within the clamping area will remain essentially stored and unreleased when the vane is subsequently operated between the open and closed positions of the valve. By virtue of storing this energy via the imposed constraints, the enlarged periphery being of limited radial extent will have limited capability to enlarge in a radial direction when the valve is opened. Since the otherwise inherent enlargement tendency of the elastomer will not be incurred, the undesirable abrading effect previously encountered is substantially, if not completely, eliminated. Moreover, by employing flathead screw fasteners overlying Nylon sleeves in countersunk apertures of the ring, the localized pressure individually applied by the screws produces a minute rotation of the ring about the screw head affording more uniform compression of the elastomer from screw to screw rather than a localized scalloping effect characteristic of the prior art.

It is therefore an object of the invention to provide a butterfly valve construction having an enhanced thruport seal.

It is a further object of the invention to provide an enhanced seal for a butterfly valve that provides controlled gasket adjustment while at the same time minimizing the level of wear previously associated with vane supported elastomers of the prior art.

It is a still further object of the invention to effect the last recited object in a manner enhancing sealing reliability and life expectancy of the gasket seal while significantly reducing the maintenance requirements previously associated therewith.

BRIEF DESCRIPTION OF THE DRAWINGS

FIG. 1 is a plan view of a "wafer" type butterfly valve with parts partially broken away;

FIG. 2 is a sectional view taken substantially along the lines 2—2 of FIG. 1;

FIG. 3 is an enlarged view of the vane and seat in their unadjusted relationship in accordance herewith; and FIG. 4 is an enlarged view of the vane and seat in their adjusted relationship in accordance herewith.

Referring now to the drawings, there is illustrated in FIG. 1 a butterfly valve which includes a housing or casing referred to generally by the character "C". The casing includes an annular body wall 10 preferably of a cast material such as ductile iron or cast iron of A126 or A48 commercial grade. Secured to the body wall is a seat 11 juxtaposed to a radial body end face 12. The seat is preferably of a type disclosed in U.S. Pat. No. 3,749,359 in which an annular stainless steel ring 32 compressibly gripping inwardly extending body boss 34 encloses an annular gasket 35. At diametrically opposite points with respect to the seat, the wall includes aligned cylindrical bores 13 sized to typically accommodate Teflon (trademark) or the like anti-friction bearing sleeves 14 and enlarged at their outer ends to provide counterbores 50. The main valve cross shaft is designated 16 and is of a non-circular formation throughout its length. Carried by the ends of shaft 16 within bores 13 are corrosion resistant bearing sleeves 17, preferably of a corrosion-proof material such as stainless steel. Each sleeve has a non-circular central bore corresponding to the shape of shaft 16 to receive and complement the shaft therethrough as to constitute the driving connection between the shaft and bearing sleeve. The outer sleeve surface is cylindrical and is journalled within Teflon sleeve 14.

The vane is referred to in its entirety by the reference character "V" which on its exterior includes a radial side face 36 and an annular periphery 37. Internally, the vane includes a central cavity 18 through which shaft 16 passes and is formed with opposite internal hubs 19. The hubs, in turn, are formed with non-circular bores 20 corresponding to the cross section of the shaft 16 received therein to establish a driving connection between the shaft and vane member "V".

At the outer end of each bore 20, there is included a counterbore 21 partially receiving bearing sleeve 17 and a static seal 22 likewise fitted therein. Positioned in each counterbore 15 is an outer seal 23, which generally comprises rubber or other suitable elastomeric material to prevent leakage of fluid from interior of the housing. At one side, seal 23 is held in position by a cover plate 24 secured to the housing by means of bolts 9. The seal 23 on the other side is held in position in a similar manner by a base plate 25 associated with the valve operating mechanism and secured to the housing by bolts 26. Other shaft mountings and driving connections for the vane could obviously be substituted for that just described.

Mounted on base plate 25 is a housing 27 for the valve operating mechanism generally designated as "O". This latter housing defines a chamber in which a vane shaft 16 is received through base plate 25 for operatively opening and closing the valve via a wrench engaging member 28 in the manner, as for example, disclosed in U.S. Pat. No. 3,420,500.

The vane and seal construction with which the invention hereof is concerned can be more readily understood with further reference to the specific showings of FIG. 3 and 4. As there shown, vane "V" includes an annular recess 38 opening into the periphery of side face 36. The recess is increasingly counter-recessed in an annular concentric slot-like formation 39 radially displaced inwardmost from the periphery. Contained in the recess is an annular, more or less complementary sectioned L-shaped, elastomeric gasket 42 of rubber or other suitable elastomeric material. Comprising the L shape of the gasket is a leg portion 43 extending radially beyond vane periphery 37 to a tip 53 for engagement with seat 11 and a foot portion 44 interfitting axially inward of complementary slot recess 39. An annular rib 45 on the inward face of gasket leg 43 maintains initial spacing between the gasket and vane face thereat.

For supporting gasket 42 there is provided an annular metal clamping ring 48 radially sized for substantially co-terminous receipt within recess 38 as to permit free extension of gasket tip 53 therepast. The inside face of ring 48 is coarse textured of continuous, relatively deep, serrations 49 for engaging the adjacent gasket surface in a deformable gripping engagement therewith. To secure and adjust the gasket in the manner hereof ring 48 includes a plurality of uniformly spaced countersunk apertures each containing a Nylon or other suitably deformable sleeve 50 through which to receive a flat head screw fastener 51. Each fastener extends through the gasket 42 for screwed mounting into the oppositely provided vane tap 52.

When installing gasket 42, the components are initially assembled in a general manner illustrated in FIG. 3 with screws 51 tightened finger tight. When so assembled the gasket will have an initial thickness "X" usually on the order of about 9/16 to ⅝ inches. Its peripheral tip 53 of free length "W" on the order of about 1/16 to ⅛ inches will be positioned substantially contiguous and generally undeformed juxtaposed to the seating surface of seat 11. For effecting a sealing relation therewith, each of the screw fasteners 51 are individually tightened as required until adequate sealing force is attained deforming tip 53 in the manner illustrated in FIG. 4. Usually this is done either by predetermined torqueing of the screws, use of a feeler gauge, or both, and which will, of course, vary with the pressure rating of the valve. It is important to note that during the course of fastener tightening to the condition of FIG. 4, only the free gasket tip 53 of dimension "W" is enlarged in this manner by virtue of the radial constraints being imposed elsewhere against the gasket.

For the purpose of specifically imposing gasket constraint of the type mentioned, a surface interference is afforded by the combination of ring serrations 49 and recess slot 39 interlocking gasket foot 44. As clamping action is increased by tightening of screws 51, a general radial expansion of the gasket is precluded by means of the imposed surface interference and instead is restricted to its free end in the vicinity of tip 53. The remaining energy of compression imposed by the increased clamping action is essentially stored in the confined portion of the gasket. With the energy being stored in this manner, rotation of the vane toward the open position affording unrestrained gasket disengagement from the seat substantially precludes the gasket tip from further increased enlargement more than an insignificant amount on the order of about 1/32 to 1/16 inches. On reclosing the valve to shutoff position, the originally controlled gasket enlargement is essentially restored without undue abrading action as would otherwise be encountered.

Not only are the previous abrading levels significantly reduced thereby, but the erratic sealing as has been caused by clamping imposed scalloping effects about the gasket periphery mentioned supra is likewise avoided or minimized. This is achieved in accordance herewith by introducing a controlled flexibility into the clamping action as can be best understood by again comparing FIGS. 3 and 4 hereof. Specifically, it can be seen that as screw 51 is tightened, not only is dimension "X" reduced to about in half to dimension "Y" on the order of 1/16 inches but ring 48 incurs a cant in assuming an angular oblique bias of angle $\alpha$ on the order of about 4° to 6°. This action is attributed to the deformable Nylon sleeve 50 which on tightening of screws 51 enables equalizing the localized pressure applied to the ring and resisted by the gasket elastomer. As localized pressure is increased, a slight ring rotation occurs about the screw head with the countersunk screw head and Nylon sleeve acting as a pivot point to thereby uniformly compress the elastomer from screw to screw. Consequently, it is possible by this arrangement to both minimize the previously encountered gasket wear factors previously induced while achieving greater uniformity of sealing effect than previously possible.

By the above description, there has been disclosed a novel butterfly valve thruport seal in which by a relatively simple construction is operatively effective in largely storing the energy of compression in the gasket. A much more controlled uniform expansion of the gasket is achieved in attaining an enhanced uniformity of sealing while at the same time greatly minimizing the abrading effects previously encountered. Since such a construction greatly minimizes the maintenance of the valve per se, not to mention the adverse effects of shutting down the pipeline for such maintenance purposes, the invention hereof fulfills a long-felt need in extending the general life expectancy and usefulness of such valves.

Since many changes could be made in the above construction and many apparently widely different embodiments of this invention could be made without departing from the scope thereof, it is intended that all matter contained in the drawings and specification shall be interpreted as illustrative and not in a limiting sense.

The embodiments of the invention in which an exclusive property or privilege is claimed are defined as follows:

1. In a butterfly valve including a body defining a fluid passage between an inlet and an outlet, a vane including a defined recess in a face at its periphery and supported in said passage for operation between a first position in which said passage is open to fluid flow and a second position in which said passage is closed to fluid flow, an annular seat on said body extending inward of said passage and an annular gasket having an integral lateral extension on a side face thereof and supported in said vane recess for cooperating with said seat when said vane is in said second position to effect shutoff of said passage to fluid flow, the improvement comprising in combination:

a. clamping means operative for compressing said gasket in an axial direction and effective to radially enlarge said gasket into a controlled sealing interfit with said seat; said clamping means including a ring positioned with a side face bearing against said gasket and a plurality of uniformly spaced individual screw fasteners extending through said ring and gasket into said vane with each of said fasteners being tightenable for locally increasing the clamping force against said gasket;

b. constraining means comprising a first interference surface including a coarse texture on the gasket engaging side face of said ring and a second interference surface including an annular offset slot on a radially inward portion of said vane recess receiving the lateral extension of said gasket, said interference surfaces being effective in concert to radially constrain a substantial portion of said gasket in a deforming grip and interlocking engagement in response to the imposed compression of said clamping means by storing energy of compression in said gasket for substantially limiting its enlargement effect to a radial free portion thereof; and c. means permitting locally limited canting of said ring from a plane extending generally transverse to the axis of the fastener thereat in response to the locally imposed clamping force for generally equalizing the effect of the clamping force between adjacent of said screw fasteners.

2. In a butterfly valve according to claim 1 in which the ring canting permitting means comprises a deformable sleeve supporting each said fastener in a fastener aperture of said ring.

* * * * *